(12) United States Patent
Umbro et al.

(10) Patent No.: US 8,789,836 B2
(45) Date of Patent: Jul. 29, 2014

(54) WHEELED CONTAINER CARRIER

(76) Inventors: Gerald Umbro, Rhinebeck, NY (US); Rosemary Kavanaugh, Rhinebeck, NY (US); Joseph Umbro, Red Hook, NY (US); David Tessel, Riverdale, NY (US)

( * ) Notice: Subject to any disclaimer, the term of this patent is extended or adjusted under 35 U.S.C. 154(b) by 387 days.

(21) Appl. No.: 12/322,972

(22) Filed: Feb. 9, 2009

(65) Prior Publication Data

US 2013/0334797 A1   Dec. 19, 2013

Related U.S. Application Data

(60) Provisional application No. 61/026,867, filed on Feb. 7, 2008.

(51) Int. Cl.
 *B62B 1/20* (2006.01)

(52) U.S. Cl.
 USPC .................. 280/47.26; 280/654; 280/655

(58) Field of Classification Search
 USPC ............ 280/654, 638, 639, 38, 42, 651, 652, 280/655, 43.1, 47.12, 47.131, 47.15, 47.16, 280/47.17, 47.2, 47.26, 47.27, 47.28, 79.5, 280/79.6; 414/444
 See application file for complete search history.

(56) References Cited

U.S. PATENT DOCUMENTS

| | | | | |
|---|---|---|---|---|
| 227,790 A | * | 5/1880 | Johnson | 414/448 |
| 228,733 A | * | 6/1880 | Curtis | 248/98 |
| 344,661 A | * | 6/1886 | Kistler | 280/47.2 |
| 345,090 A | * | 7/1886 | Walter | 414/456 |
| 483,006 A | * | 9/1892 | Nichless | 414/456 |
| 553,455 A | * | 1/1896 | Evered | 248/98 |
| 641,594 A | * | 1/1900 | Hartwich | 280/47.26 |
| 1,544,356 A | * | 6/1925 | Spaeth | 280/47.26 |
| 1,718,962 A | * | 7/1929 | Kimball | 280/655 |
| 1,751,902 A | * | 3/1930 | Brown | 280/47.26 |
| 2,405,674 A | * | 8/1946 | Anderson et al. | 280/659 |
| 2,406,183 A | * | 8/1946 | Allen | 280/655 |
| 2,421,322 A | * | 5/1947 | Frazin | 280/655 |
| 2,422,298 A | * | 6/1947 | Freis | 280/42 |
| 2,476,539 A | * | 7/1949 | Fortin | 414/453 |
| 2,510,676 A | * | 6/1950 | Biek | 414/450 |
| 2,520,226 A | * | 8/1950 | Smith | 280/652 |
| D163,327 S | * | 5/1951 | Rose | D34/15 |
| 2,639,163 A | * | 5/1953 | Walker | 280/47.26 |
| 2,840,384 A | * | 6/1958 | Bard | 280/47.371 |
| 2,869,885 A | * | 1/1959 | Doyle, Jr. | 280/47.17 |
| 2,904,345 A | * | 9/1959 | Bradley | 280/47.131 |
| 2,930,561 A | * | 3/1960 | Bittle | 248/149 |
| 3,041,026 A | * | 6/1962 | Wilson | 248/98 |
| 3,180,507 A | * | 4/1965 | Ott et al. | 414/457 |
| 3,193,123 A | * | 7/1965 | Wouden | 414/456 |
| 3,214,120 A | * | 10/1965 | McKee | 248/129 |
| 3,241,852 A | * | 3/1966 | Muller et al. | 280/40 |
| 3,272,529 A | * | 9/1966 | Rachman | 280/47.131 |
| 3,356,383 A | * | 12/1967 | Sneed | 280/47.26 |
| 3,399,903 A | * | 9/1968 | Bailey | 280/47.34 |

(Continued)

*Primary Examiner* — Katy M Ebner
*Assistant Examiner* — Brodie Follman
(74) *Attorney, Agent, or Firm* — Ostrolenk Faber LLP

(57) ABSTRACT

A portable transporting carrier for standard size buckets and for standard size propane gas tanks with wheels connected by an axle element and configured to position and support the bucket or the tank on the axle element and with an offset handle positioned over a center of gravity of the bucket or tank to facilitate lifting and carrying of the carrier with supported bucket or tank. The carrier is optionally convertible to a transportable working skid.

11 Claims, 19 Drawing Sheets

(56) References Cited

U.S. PATENT DOCUMENTS

| | | | | |
|---|---|---|---|---|
| 3,647,238 | A * | 3/1972 | Mackey | 280/47.29 |
| 3,754,771 | A * | 8/1973 | Shagoury | 280/654 |
| 3,784,138 | A * | 1/1974 | Herling et al. | 248/96 |
| 3,893,699 | A * | 7/1975 | Morris | 280/659 |
| 4,179,132 | A * | 12/1979 | Rich | 280/47.26 |
| 4,222,145 | A * | 9/1980 | Lowder | 15/353 |
| 4,274,644 | A * | 6/1981 | Taylor | 280/39 |
| 4,424,999 | A * | 1/1984 | Commins | 294/142 |
| 4,452,468 | A * | 6/1984 | Eads et al. | 280/641 |
| 4,614,349 | A * | 9/1986 | Wenzel | 280/43.1 |
| 4,640,521 | A * | 2/1987 | Berfield | 280/47.34 |
| 4,650,200 | A * | 3/1987 | Berfield et al. | 280/47.26 |
| 4,753,445 | A * | 6/1988 | Ferrare | 280/47.131 |
| 4,858,940 | A * | 8/1989 | Cheng | 280/5.2 |
| 5,096,265 | A * | 3/1992 | Chang | 301/111.06 |
| 5,106,112 | A * | 4/1992 | Sargent | 280/40 |
| 5,209,517 | A * | 5/1993 | Shagoury | 280/654 |
| 5,257,800 | A * | 11/1993 | Yang | 280/654 |
| 5,294,145 | A * | 3/1994 | Cheng | 280/654 |
| 5,380,033 | A * | 1/1995 | Harling | 280/654 |
| 5,393,080 | A * | 2/1995 | Ross | 280/47.26 |
| 5,397,151 | A * | 3/1995 | Jserng | 280/654 |
| 5,445,398 | A * | 8/1995 | Pierce | 280/47.26 |
| 5,464,244 | A * | 11/1995 | Tsai | 280/655 |
| 5,499,702 | A * | 3/1996 | Wang | 190/115 |
| 5,515,576 | A * | 5/1996 | Tsai | 16/113.1 |
| 5,526,908 | A * | 6/1996 | Wang | 190/115 |
| 5,544,910 | A * | 8/1996 | Esposito | 280/654 |
| 5,549,318 | A * | 8/1996 | Ho | 280/654 |
| 5,749,446 | A * | 5/1998 | Hsieh | 190/107 |
| 5,951,037 | A * | 9/1999 | Hsieh et al. | 280/654 |
| 6,000,713 | A * | 12/1999 | Lin | 280/647 |
| 6,012,729 | A * | 1/2000 | Lin | 280/47.18 |
| 6,053,516 | A * | 4/2000 | Ottaway | 280/79.5 |
| 6,059,515 | A * | 5/2000 | Keller et al. | 414/721 |
| 6,082,757 | A * | 7/2000 | Lin | 280/654 |
| 6,102,433 | A * | 8/2000 | Stevens | 280/646 |
| 6,113,129 | A * | 9/2000 | Marques et al. | 280/654 |
| 6,425,599 | B1 * | 7/2002 | Tsai | 280/652 |
| 6,454,281 | B1 * | 9/2002 | Pearson | 280/47.26 |
| 6,508,477 | B2 * | 1/2003 | Burkett | 280/47.26 |
| 6,554,300 | B1 * | 4/2003 | Ziolkowski | 280/47.27 |
| 6,666,466 | B1 * | 12/2003 | Rainho | 280/47.27 |
| 6,688,636 | B2 * | 2/2004 | Han | 280/655 |
| 6,899,346 | B2 * | 5/2005 | Pfeiffer | 280/47.29 |
| 7,036,641 | B2 * | 5/2006 | Russo et al. | 190/18 A |
| 7,140,635 | B2 * | 11/2006 | Johnson et al. | 280/646 |
| 7,201,383 | B2 * | 4/2007 | Gibby | 280/47.26 |
| 7,258,352 | B2 * | 8/2007 | Odgers | 280/47.28 |
| 7,322,585 | B2 * | 1/2008 | Handelman et al. | 280/47.26 |
| 7,431,314 | B2 * | 10/2008 | Donaldson | 280/47.27 |
| 7,438,084 | B2 * | 10/2008 | Trettin et al. | 137/355.16 |
| 7,458,600 | B1 * | 12/2008 | Berke et al. | 280/651 |
| 7,597,341 | B2 * | 10/2009 | Russo | 280/655.1 |
| 7,614,628 | B2 * | 11/2009 | O'Connor | 280/37 |
| 7,997,593 | B2 * | 8/2011 | Sergyeyenko et al. | 280/47.26 |
| 8,061,723 | B1 * | 11/2011 | Carroll et al. | 280/47.29 |
| 8,167,322 | B2 * | 5/2012 | Greene | 280/47.26 |
| 8,181,974 | B1 * | 5/2012 | Galvan et al. | 280/79.5 |
| 8,262,106 | B1 * | 9/2012 | Suszynsky | 280/47.131 |
| 2002/0074755 | A1 * | 6/2002 | Burkett | 280/47.26 |
| 2002/0101065 | A1 | 8/2002 | McCollum et al. | 280/655 |
| 2002/0109322 | A1 * | 8/2002 | Bock | 280/79.11 |
| 2002/0171213 | A1 * | 11/2002 | Kim | 280/47.26 |
| 2003/0038008 | A1 * | 2/2003 | Han | 190/115 |
| 2003/0234503 | A1 * | 12/2003 | Chiang | 280/47.131 |
| 2003/0234514 | A1 * | 12/2003 | Han | 280/651 |
| 2003/0234516 | A1 * | 12/2003 | Han | 280/655 |
| 2005/0001394 | A1 * | 1/2005 | Gibby | 280/47.26 |
| 2005/0074317 | A1 * | 4/2005 | Escorza et al. | 414/444 |
| 2006/0071435 | A1 * | 4/2006 | Zwack | 280/47.27 |
| 2006/0091628 | A1 * | 5/2006 | Cheslak | 280/47.27 |
| 2006/0186623 | A1 * | 8/2006 | Cox et al. | 280/47.17 |
| 2006/0226619 | A1 * | 10/2006 | Sadow | 280/47.26 |
| 2006/0244242 | A1 * | 11/2006 | Woo | 280/651 |
| 2006/0261564 | A1 * | 11/2006 | Chuang | 280/47.27 |
| 2008/0265535 | A1 * | 10/2008 | Heylen | 280/47.12 |
| 2009/0096181 | A1 * | 4/2009 | Cole et al. | 280/47.35 |
| 2009/0206568 | A1 * | 8/2009 | Lee | 280/47.26 |
| 2010/0237576 | A1 * | 9/2010 | Maccario | 280/47.26 |
| 2010/0327562 | A1 * | 12/2010 | Kasuya et al. | 280/651 |
| 2013/0127128 | A1 * | 5/2013 | Meidl | 280/47.17 |

* cited by examiner

WHEELED CONTAINER CARRIER

CROSS REFERENCE TO RELATED APPLICATIONS

This application claims the benefit and priority of U.S. Provisional patent application Ser. No. 61/026,867, filed Feb. 7, 2008 entitled BUCKET AND TANK CARRIER, the entire disclosure of which is incorporated herein by reference.

FIELD OF THE INVENTION

This invention relates to article carriers and particularly to article carriers for 5 gallon buckets and consumer propane gas cylinders or tanks.

Literally hundreds of products used in our daily lives are sold in standardized containers such as 5 gallon buckets. Standard 5 gallon buckets have standardized size dimensions of about 10.5" base diameter, and a height of about 14.5". Propane gas cylinders are also standardized in sizes (designated as pounds) such as sold as #20 (5 gal.), #30 (7 gal.) and #40 (10 gal.), all of which have about 12.25" diameters and one inch high bases of about 7 and ¾" diameter (larger capacities differ in greater cylinder height). The current industry standard requires the consumer to lift and carry 5 gallon buckets using only the handle provided by the bucket manufacturer or by the integral metal collars of the propane cylinders.

SUMMARY OF THE INVENTION

It is accordingly an object of the present invention to provide lightweight, wheeled carriers with minimal stored volume but with very high transport weight capacity for standardized size containers.

It is a further object of the present invention to facilitate lifting of the containers on the wheeled carriers and to provide an integrated moving skid.

In accordance with the present invention, wheeled carriers designated herein as "Bucket Buggy" for transport of 5 gallon buckets consumers are able to easily transport, and permit lifting and use of products that are sold in 5 gallon-size buckets without strenuous effort normally required. A second carrier embodiment, within the scope of the present invention is adapted for use with tanks such as standard propane gas cylinders or tanks and is designated herein as "Tank Trolley".

Generally the present invention comprises a wheeled carrier for containers comprising:

a) two wheels; b) an elongated axle member connecting the wheels; c) a handle member configured for enabling a user to move or lift the wheeled carrier, with the axle being engaged with the handle member, and d) a container support member integral with the axle member. The container support member is either a separate element configured to support a container in a position directly on the axle member with the axle member directly supporting substantially the full weight of the container or it is the axle member, itself. With the weight being supported directly on the axle, a small folded storable carrier with approximate dimensions of about 3" wheel thickness by about 16" height by about 12" width (excluding wheels), is capable of safely transporting up to about 160 pounds of load.

SHORT DESCRIPTION OF THE DRAWINGS

The above and other objects, features, and advantages of the present invention will become more evident from the following discussion and drawings in which:

FIG. 3b is a side view of the folded bucket carrier of FIG. 3a;

DETAILED DESCRIPTION OF THE INVENTION AND DRAWINGS

Figure 5:
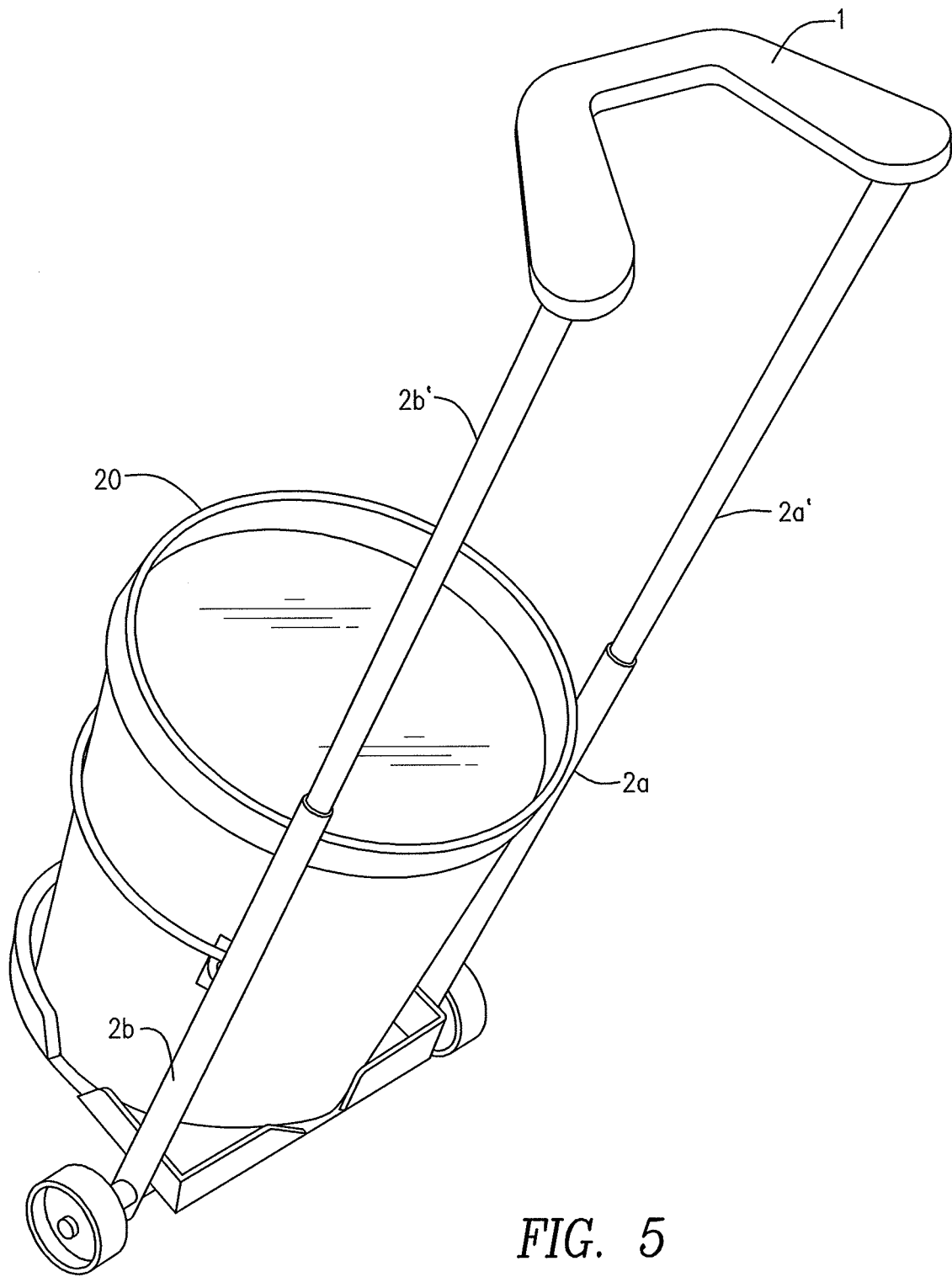
FIG. 5 shows a mode of the bucket being transported in the carrier.
Figure 6:
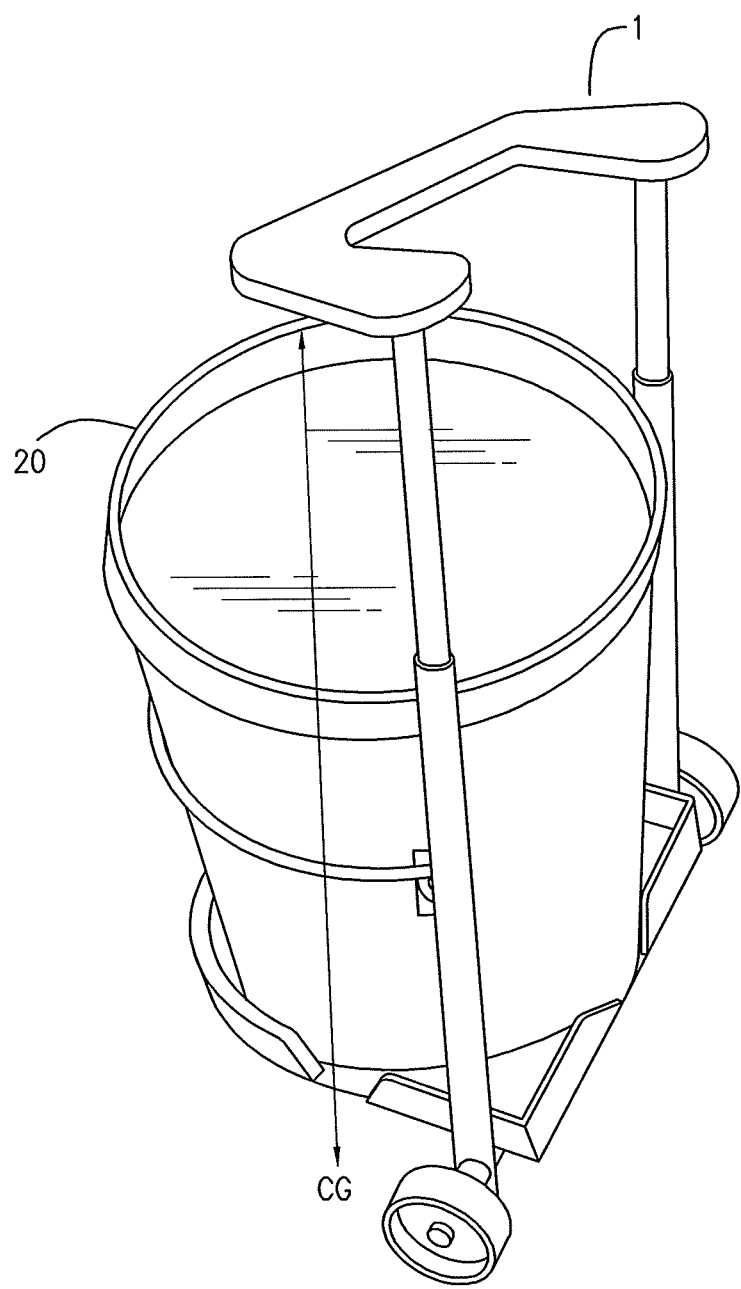
FIG. 6 shows a mode the bucket being lifted by hand while in the carrier.
Figure 7:
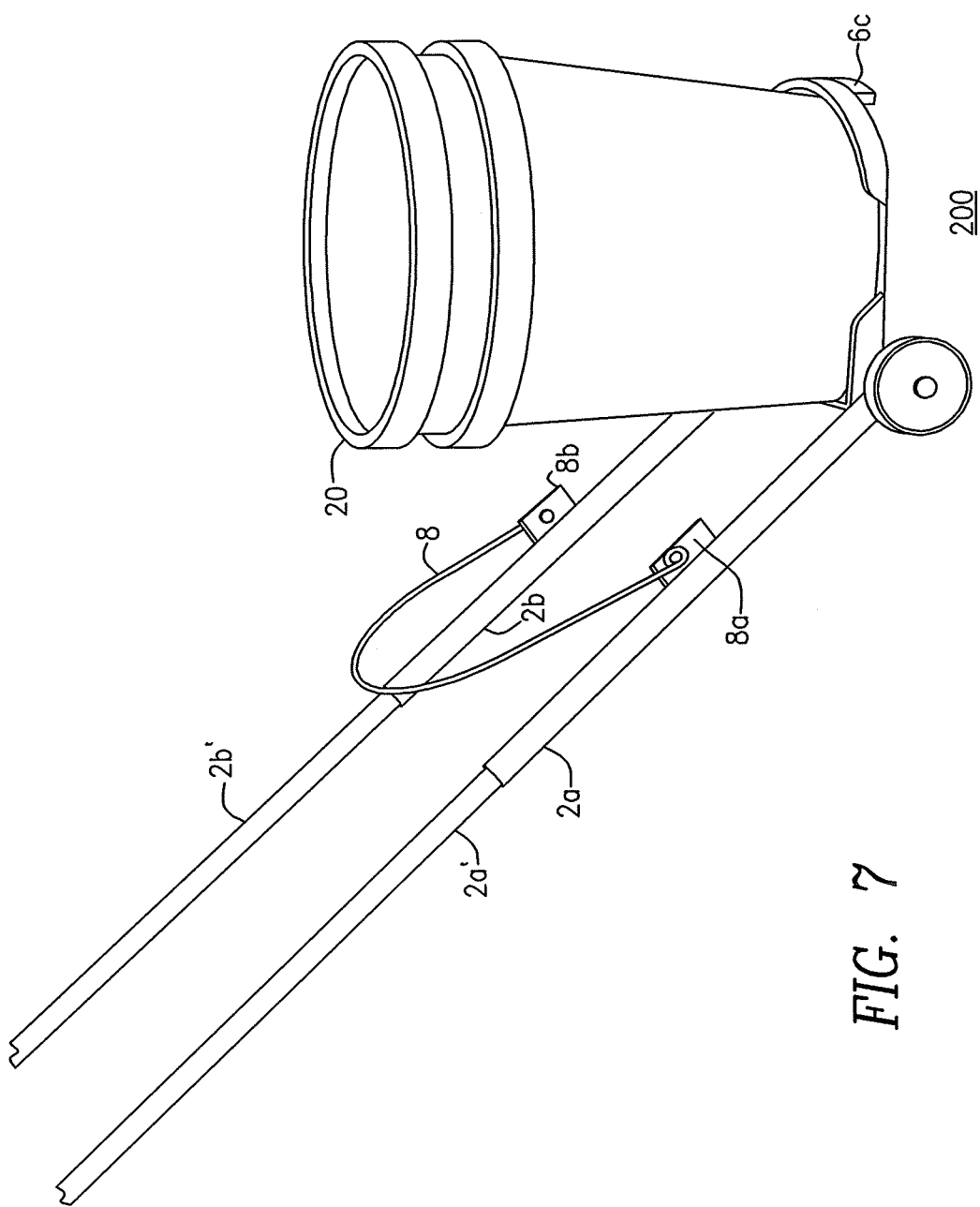
FIG. 7 shows a mode of the bucket carrier being used as a skid for the bucket.

With the Bucket Buggy container carrier 10, the consumer simply slips the bucket 20 into position, and now the heavy bucket can be wheeled rather than carried, as shown in the embodiment shown in FIGS. 1-7. The carrier 10 comprises 3" wheels 3a and 3b, connected by axle or axle member 5, more clearly seen in FIG. 3a. Telescoping rods or struts 2a and 2b with respective telescoping rods or extension elements 2a' and 2b', connect the axle 5 to handle grip 1 to constitute the drive handle for the carrier. Struts 2a and 2b are spaced sufficiently close together to positionally support the peripheral sides of bucket 20. Bucket 20 rests directly on a container support member 6a, which in turn rests directly on the axle 5 (i.e., weight placed on support member 6a is actually entirely supported by the axle). As more clearly seen in FIGS. 2-7, support member 6a is provided with a foldable stabilizing extension platform 6b which stabilizes a bucket 20 from tipping over, in conjunction with bucket retaining hoop 8 (shown deployed in FIGS. 4-6). Extension 6b has a stabilizing foot 6c which keeps bucket 20 parallel to the ground 200, as shown in FIG. 7, when the carrier functions as a moving skid. In such latter operative embodiment, retaining hoop is swiveled away from engagement with the bucket 20 via swivel elements 8a (FIG. 7).

When transferring the bucket into a car, or whenever lifting is required, the telescoping handle 1 positively locks into position over the center of gravity (line CG) as shown in FIG. 6, becoming a safe and comfortable handle for one-handed or two-handed lifting.

Figure 1:
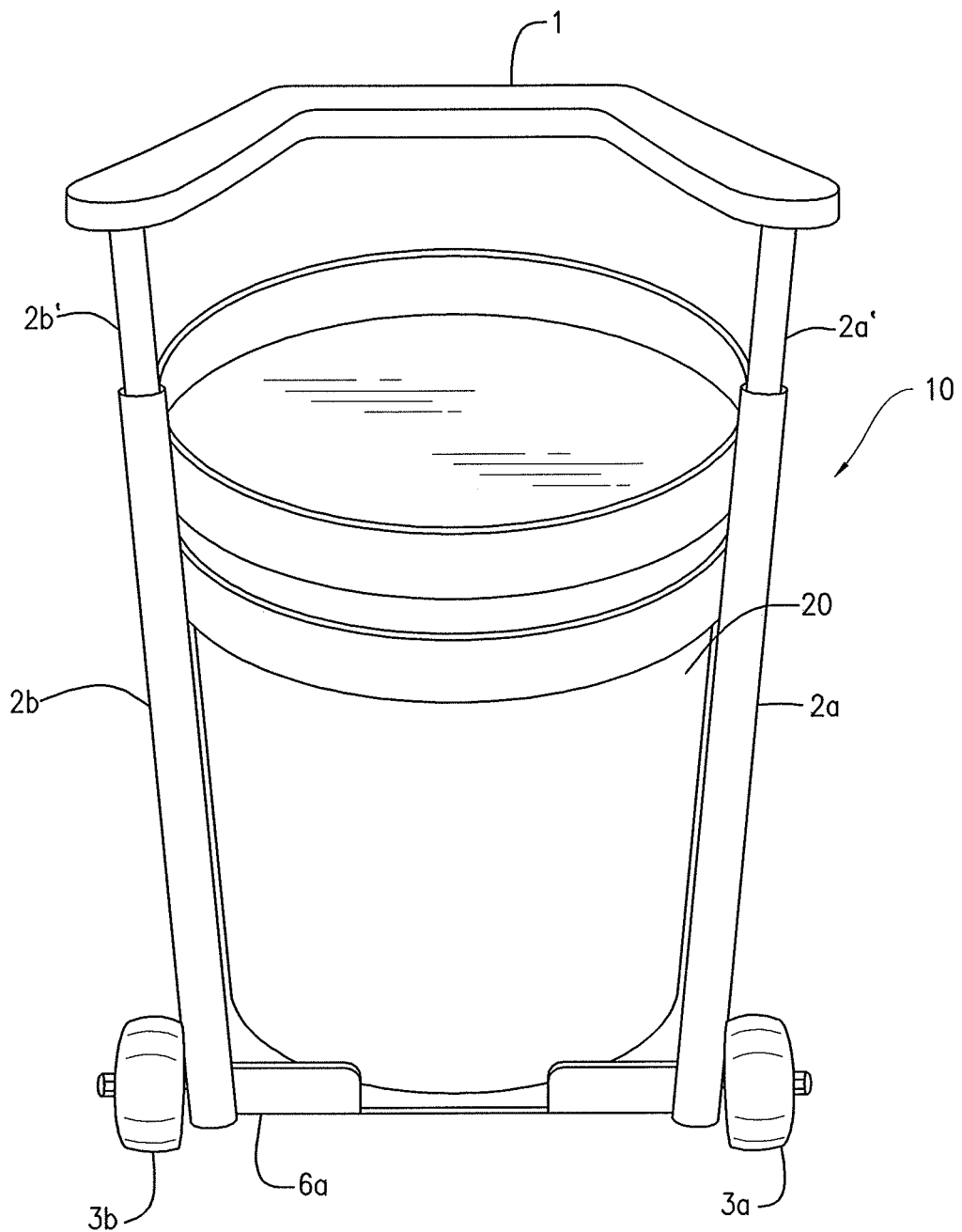
FIG. 1 is a rear view of a bucket carrier embodiment of the present invention with a bucket placed thereon.
Figure 2:
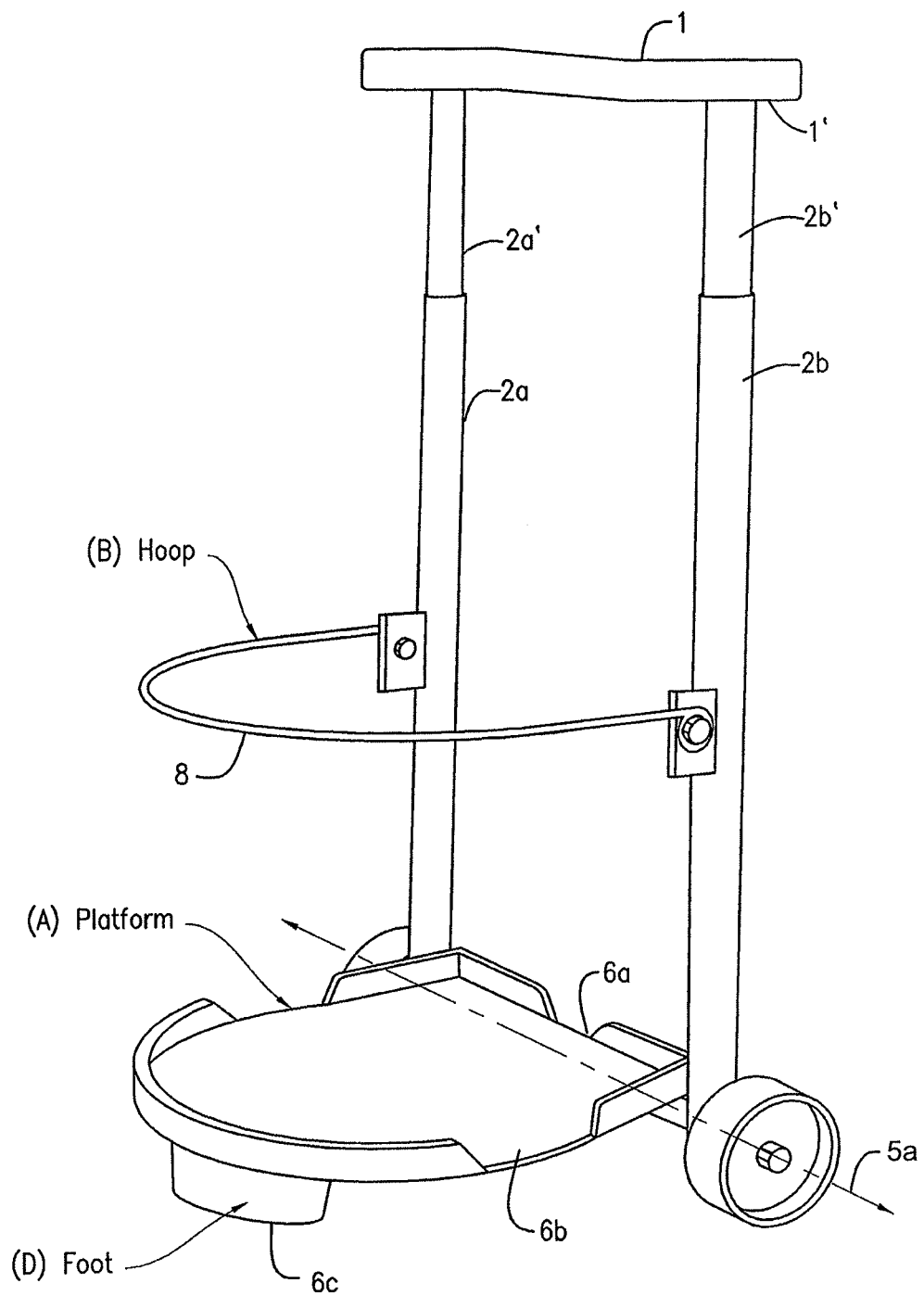
FIG. 2 is a perspective view of the bucket carrier of FIG. 1, without the bucket.

The platform 6b and hoop 8 of the Bucket Buggy in FIG. 2 are customized to the exact size and shape of a standard 5 gallon bucket, to keep the bucket securely in position during transport. However, it is important to note that this carrier and platform is not a hand truck, because the platform 6b does not support the weight of the bucket 20 as do scantilevered platforms of hand trucks. With the Bucket Buggy carrier, the weight of the bucket rests completely on the axle 5 and not on the platform. With this design, the carrier can be made very light-weight and collapsible. With proper retaining element such as tightenable straps (not shown) taking the place of hoop 8, even support member 6a can be dispensed with, with the bucket resting directly on axle 5.

The purpose of the platform 6b in the present carrier structure is only to hold the bottom of the bucket in position, preventing lateral motion during transport, and to provide a foot 6c that holds the bucket level when sitting flat. The platform 6b may accordingly be shortened or eliminated entirely with the use of a retaining element such as a strap (for example with a releasable locking member or a hook and eye fabric fastener).

Figure 3A:
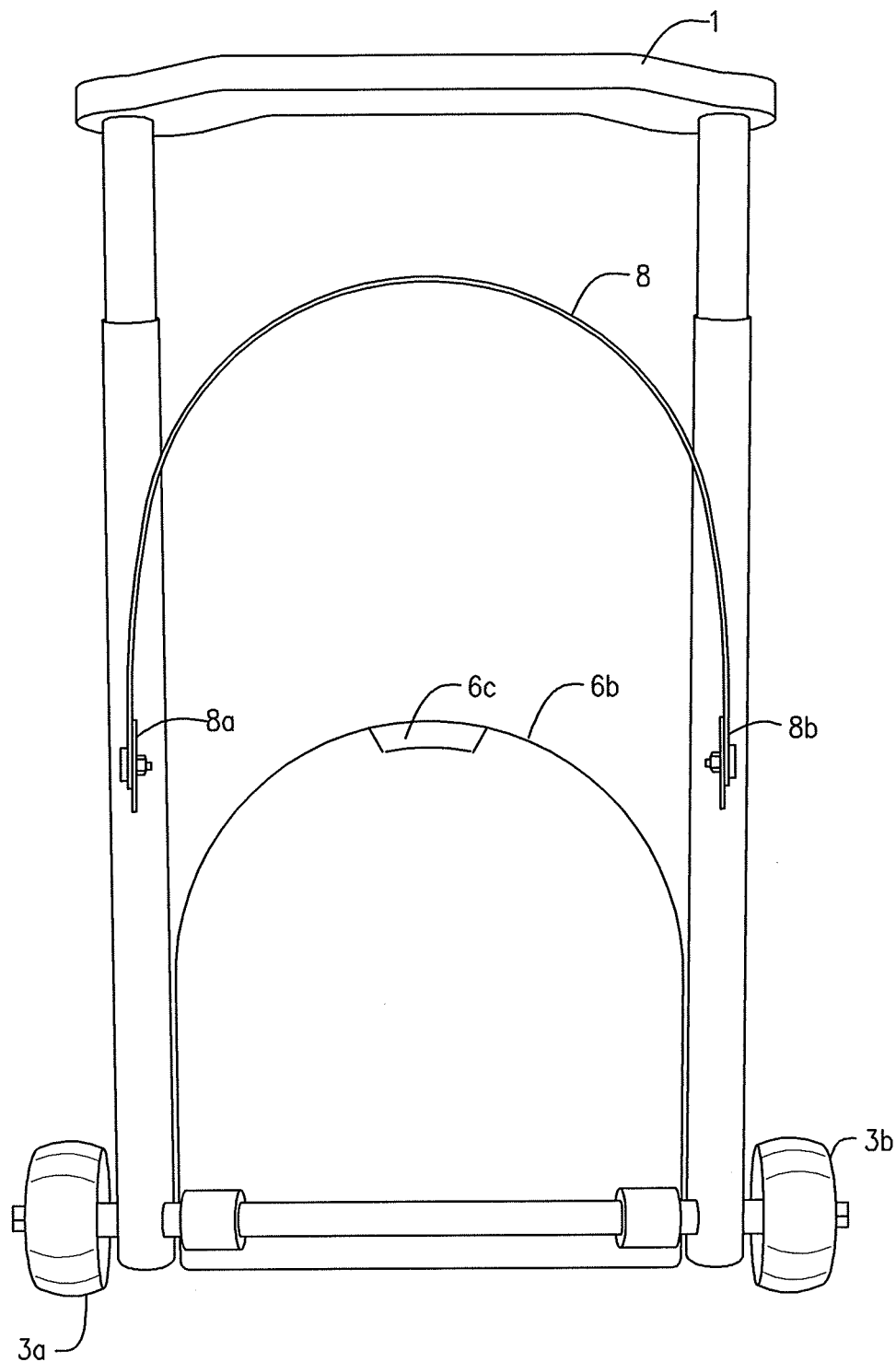
FIG. 3a is a rear view of the bucket carrier of FIG. 2 in a folded configuration.
Figure 3B:
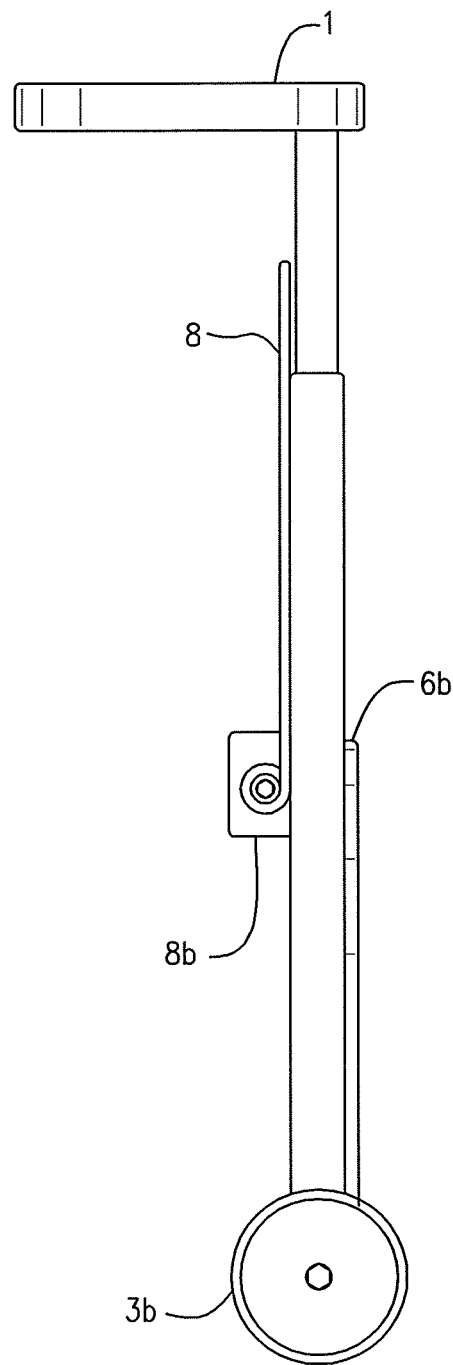

The Bucket Buggy carrier 10 folds into a flat, compact form for easy storage as shown in FIGS. 3a and 3b. Connection of gripping handle 1 with telescoping extension rods 2a' and 2b' may be made with a 3-way locking position connection (not shown) wherein the gripping curvature can be placed over the bucket's center of gravity (FIG. 6) or 180° away therefrom for facilitated pulling or pushing. The third position is in direct line with the rods 2a' and 2b' to further reduce the storage profile shown in FIGS. 3a and 3b. In FIG. 2, the wheels 3a, 3b are shown to be rotatable around axis 5a

The consumer can readily keep carrier 10 on hand in his or her car (with minimal weight and storage space) so that it is conveniently available whenever needed. Retailers can keep a rack of them on display at the points of purchase for all of their products sold in 5 gallon buckets.

Figure 4:
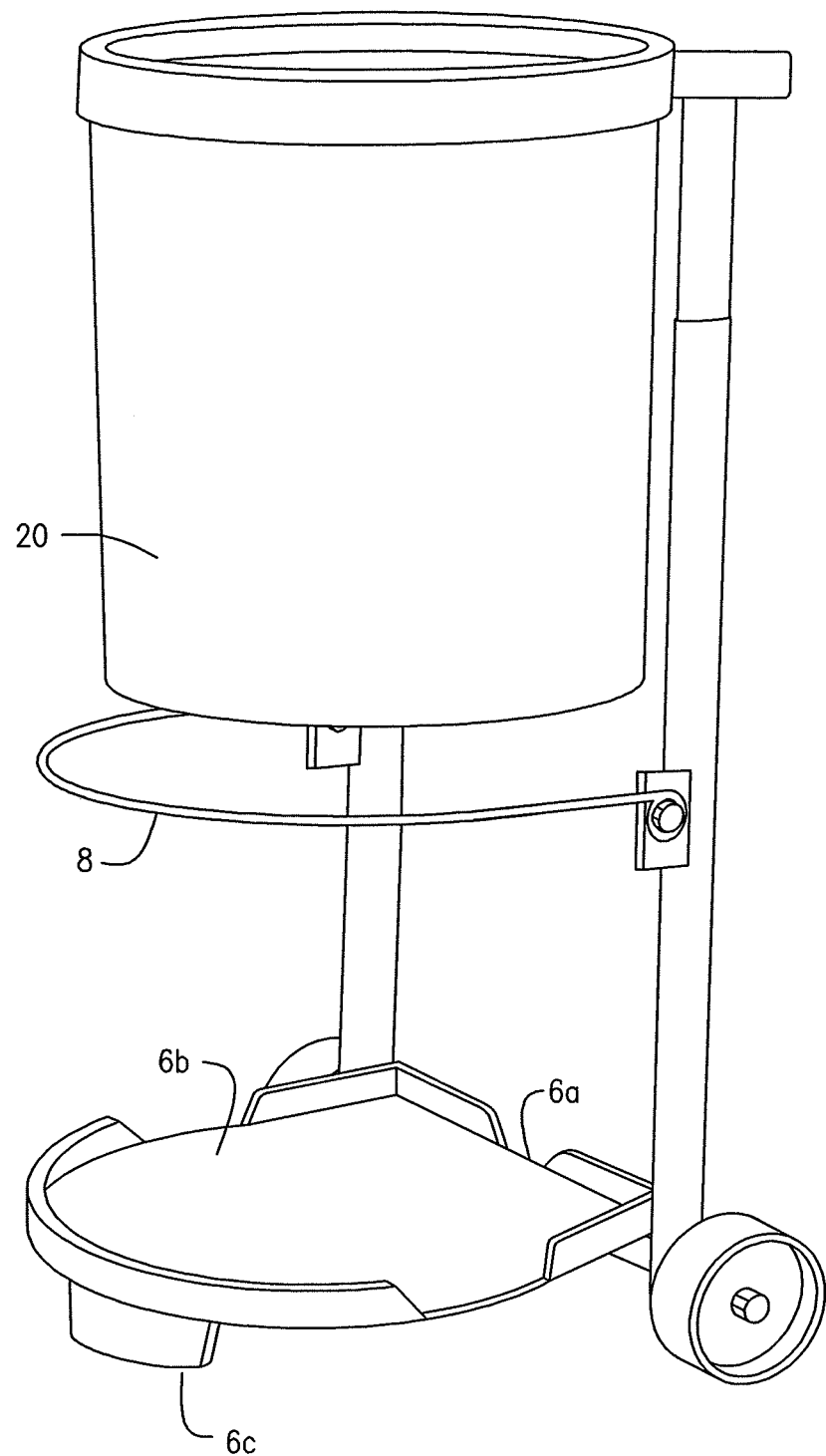
FIG. 4 depicts a bucket being placed in the bucket carrier of FIG. 2.

To initiate use of the Bucket Buggy carrier 10, the platform 6b and hoop 8 are simply folded down and the telescoping handle 1 lifted. Bucket 20 is then placed into position as shown in FIG. 4. The hoop 8 holds the bucket securely against the strut bars 2a and 2b and the weight of the bucket 20 rides on the axle 5 as shown in FIG. 5.

In use, the handle 1 is tilted and the bucket will roll easily over virtually any surface.

To lift the bucket 20 using the Bucket Buggy carrier 10, just slide the telescoping handle 1 down into the lowest position. The handle 1 will lock into position and is designed to align perfectly with the bucket's center of gravity CG. This keeps the bucket and its contents level during lifting, as shown in FIG. 6. The curvature of the handle makes it easy to lift the bucket with either one hand or with both hands.

It is possible to use the Bucket Buggy carrier to transport stacked buckets with modification of the curvature of the handle to permit placement of a second bucket and an additional holding element such as a second strap. Alternatively, a second full or partial platform may be provided for the second bucket.

Often, when using a product contained in a 5-gallon bucket, the user is required to move the bucket from place to place while using the product. For example, when painting a wall, resurfacing a driveway, dispersing ice melt salt or sand, applying grout or adhesive over a floor, spreading grass seed or fertilizer—all these jobs require the user to move the bucket from one position to another repeatedly.

With this in mind, the Bucket Buggy carrier is optionally designed to easily become a skid as shown in FIG. 7. To use the Bucket Buggy carrier 10 as a skid, simply detach one end of the hoop 8 from swivel element 8a and fold the hoop up as shown, so that it is no longer supporting the bucket. The handle 1 is then free to tilt backward and forward freely, and the wheels 3a and 3b and foot 6c of the platform form a skid that can be easily rolled in any direction, into any convenient position, without ever having to lift the heavy bucket.

Tank Trolley Embodiment

Figure 8:
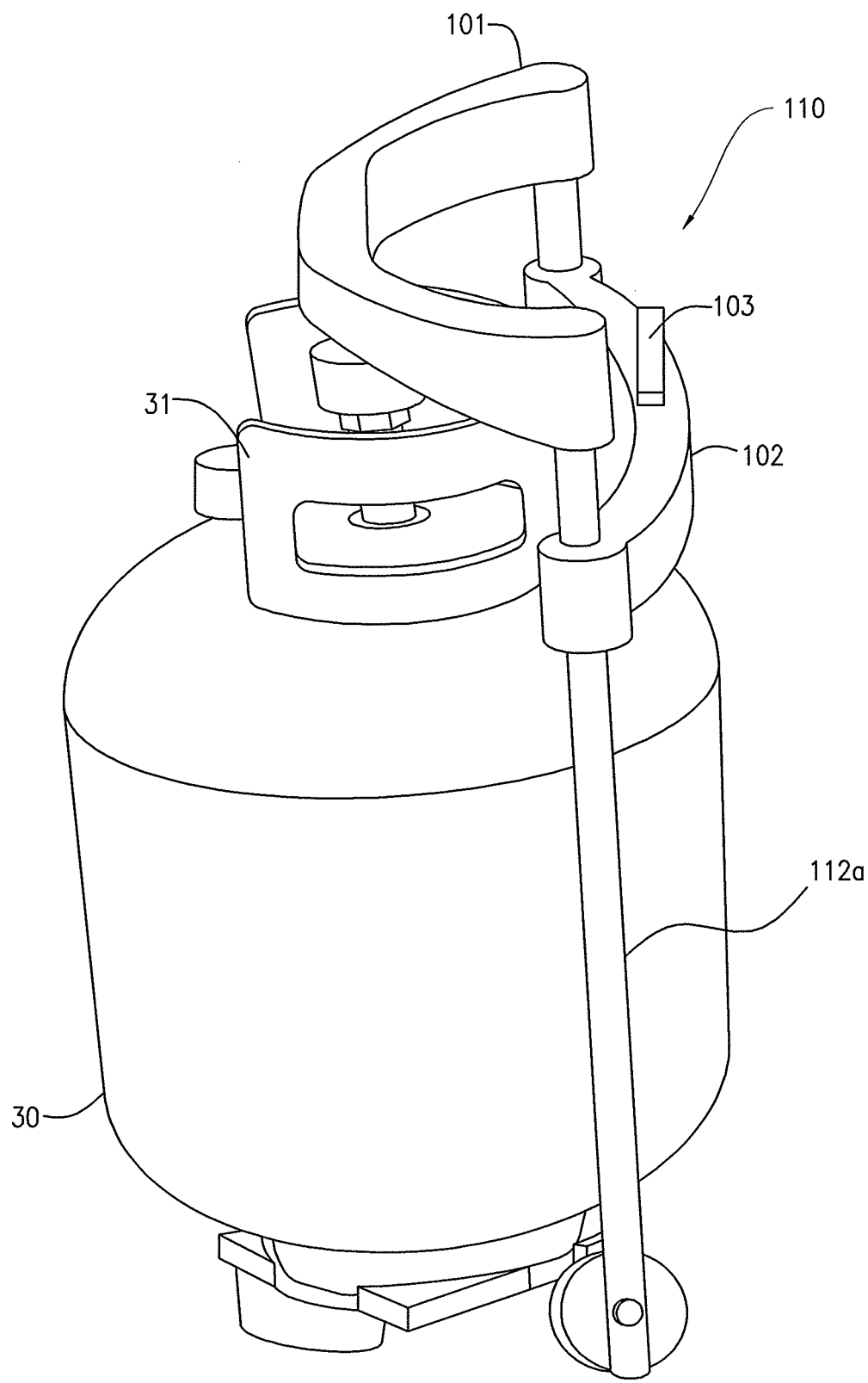
FIG. 8 is a side view of a propane gas tank carrier embodiment with a propane tank placed thereon.

In another embodiment of the carrier of the present invention the Tank Trolley embodiment 110, shown in FIGS. 8-16, is one especially useful variation on the Bucket Buggy carrier that is specifically designed to accommodate liquid propane gas ("LPG") cylinders or tanks 30 shown in FIG. 8. Similar to the Bucket Buggy carrier of FIGS. 1-7, which is designed for and which works for 5 gallon buckets, the Tank Trolley carrier 110 enables consumers to easily transport, lift and use 20-pound (#20) and 30-pound (#30) and even 40-pound (#40) propane tanks 30 without the normally required strenuous effort.

Figure 9:
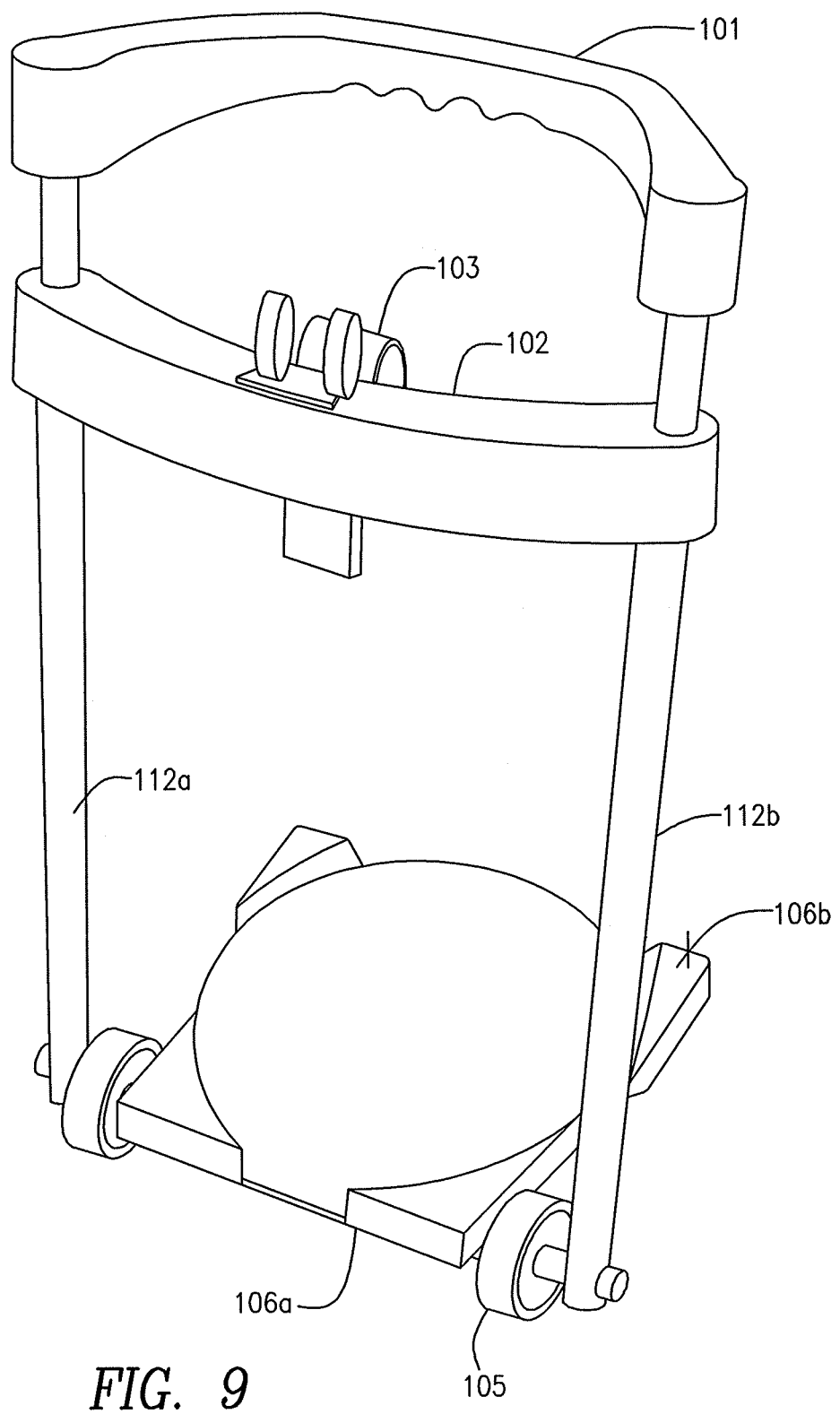
FIG. 9 is an isometric rear view of the propane gas tank carrier of FIG. 8 without the propane gas tank.

As with the Bucket Buggy carrier, the platform 106b on the Tank Trolley does not support the weight of the tank FIG. 9. All of the weight rests on container support 106a with weight support provided by axle 105. The platform 106b is specially sized and shaped to keep the tank 30 from moving laterally during transport. It also has a foot 106c on the bottom of the platform to keep the tank level when sitting flat.

Figure 10:
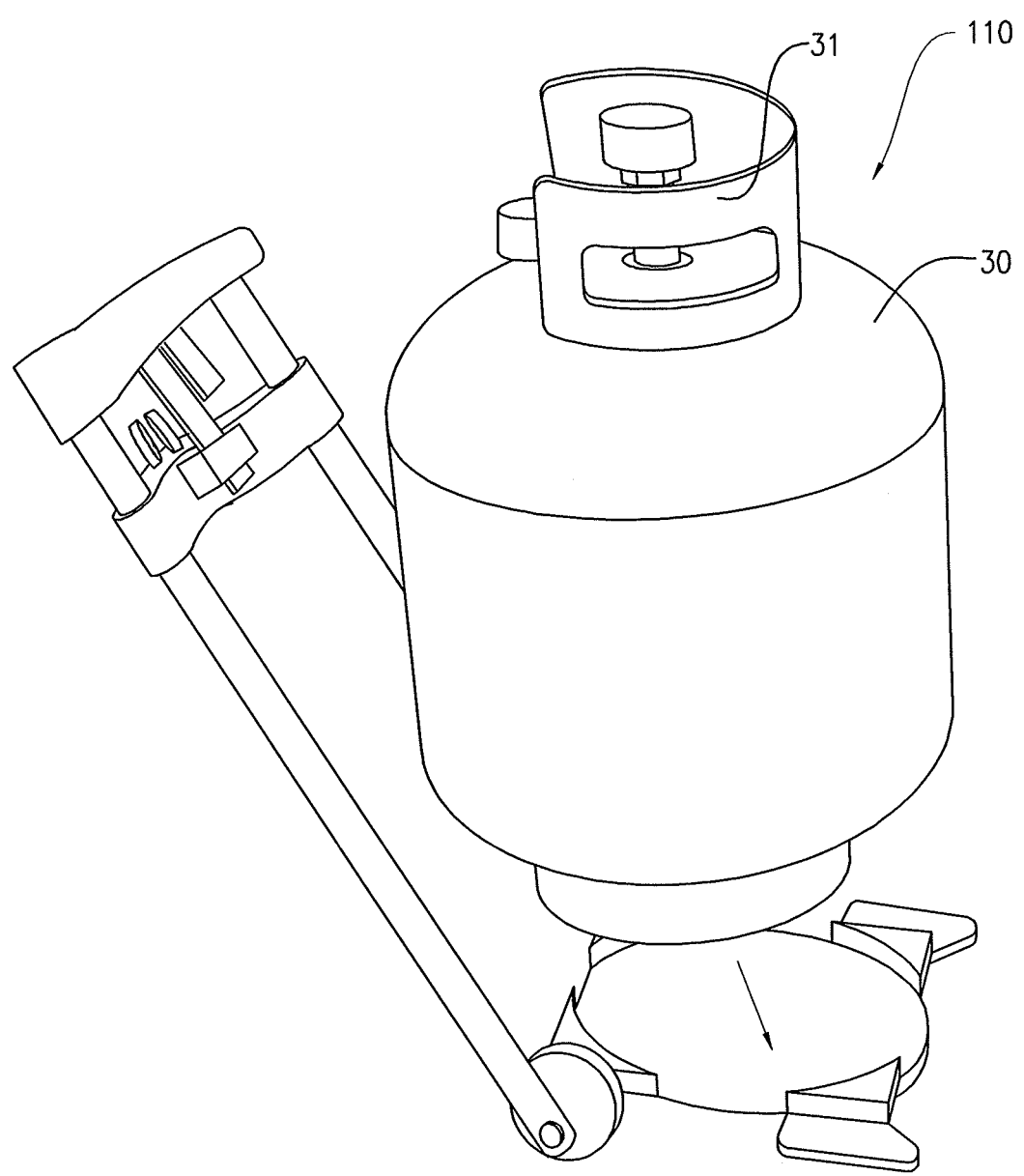
FIG. 10 shows placement of a propane gas tank on the carrier of FIG. 9.

To use the Tank Trolley carrier 110, just place the tank 30 on the platform 106c, and place the handle 101 back into position over the top of the tank as shown in FIG. 10.

Figure 11:
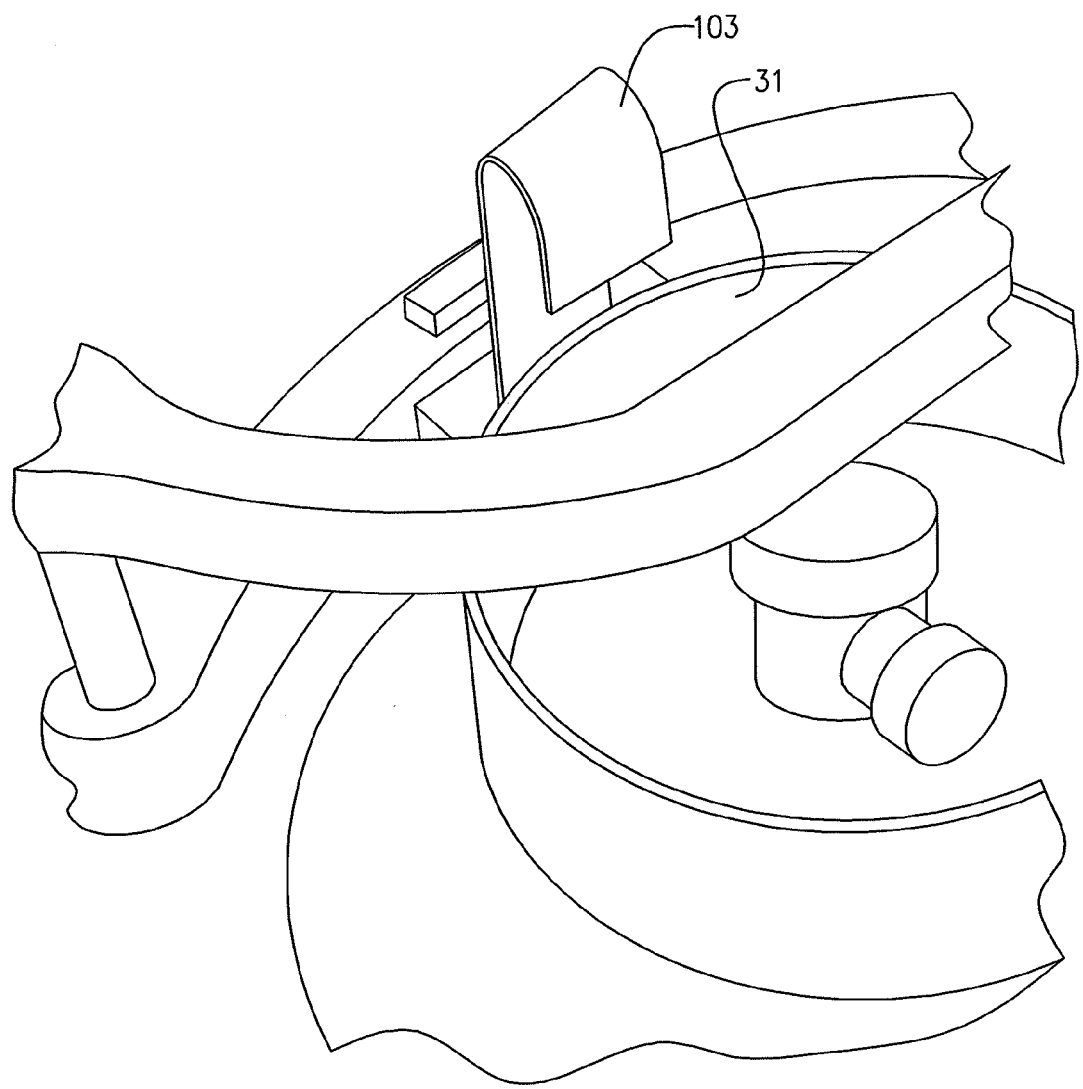
FIG. 11 depicts a holding clip used for retaining the propane gas tank on the carrier.

Because of the configuration of standard propane gas tanks, retaining hoop 8 is replaced with a retaining clip 103 which positively engages and holds metal collar 31 of standard propane tanks 30. In effecting tank retention onto the carrier 110, the clip 103 (integrated with movable cross bar 102) is made to slide over the lip of the tank collar 31 as shown in FIG. 11. Just as the hoop 8 of the Bucket Buggy carrier holds the bucket in place against the bars, the clip 103 holds the tank securely against the bars 112a and 112b of the Tank Trolley carrier 110. The clip height can be adjusted by vertical movement of cross bar 102, to accommodate 20-pound, 30-pound or 40-pound propane tanks. Because of the placement of collar 31 and valve 33 of propane tanks, stacking of such tanks is not viably possible.

Figure 12:
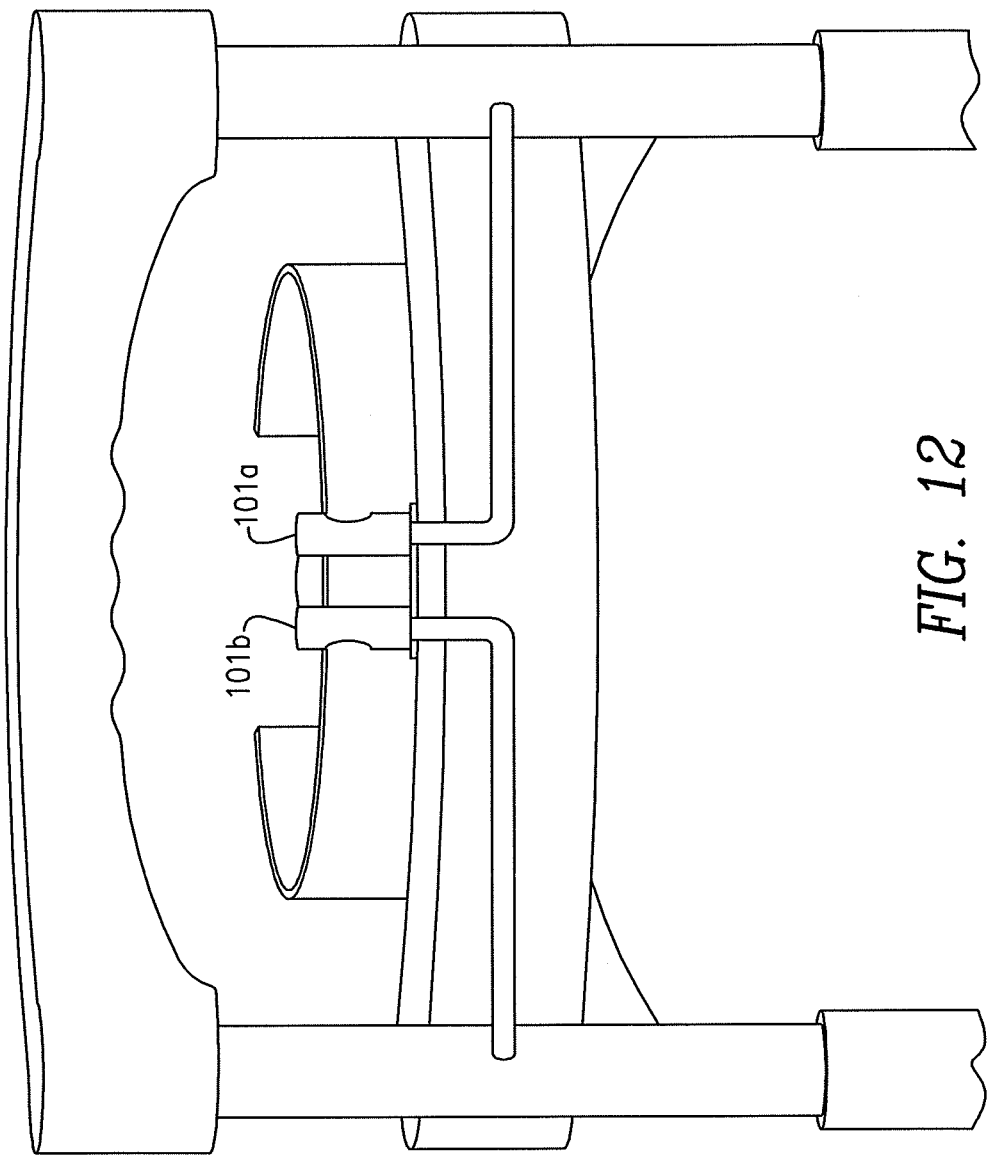
FIG. 12 is a cutaway view showing a handle pin retaining lock for the propane gas tank carrier.

The handle 101 of the Tank Trolley positively locks into a vertical position with a pair of spring-loaded pins 101a and 101b, as shown in the cutaway view of FIG. 12. This is an important safety feature when lifting or transporting anything heavy, especially something potentially explosive.

Figure 12A:
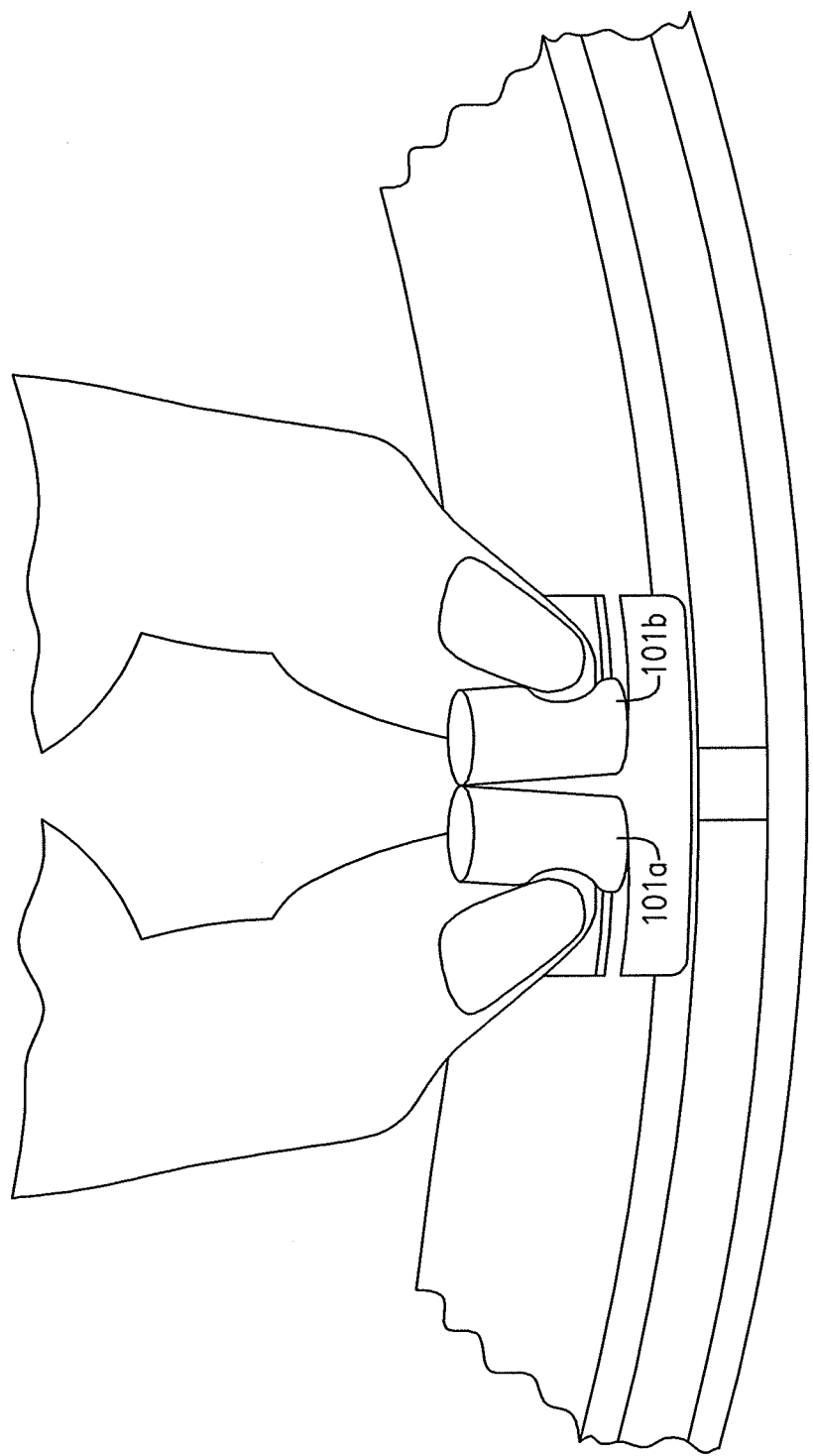
FIGS. 12a and 12b depict open and closed conditions respectively of the handle pin retaining lock.
Figure 12B:
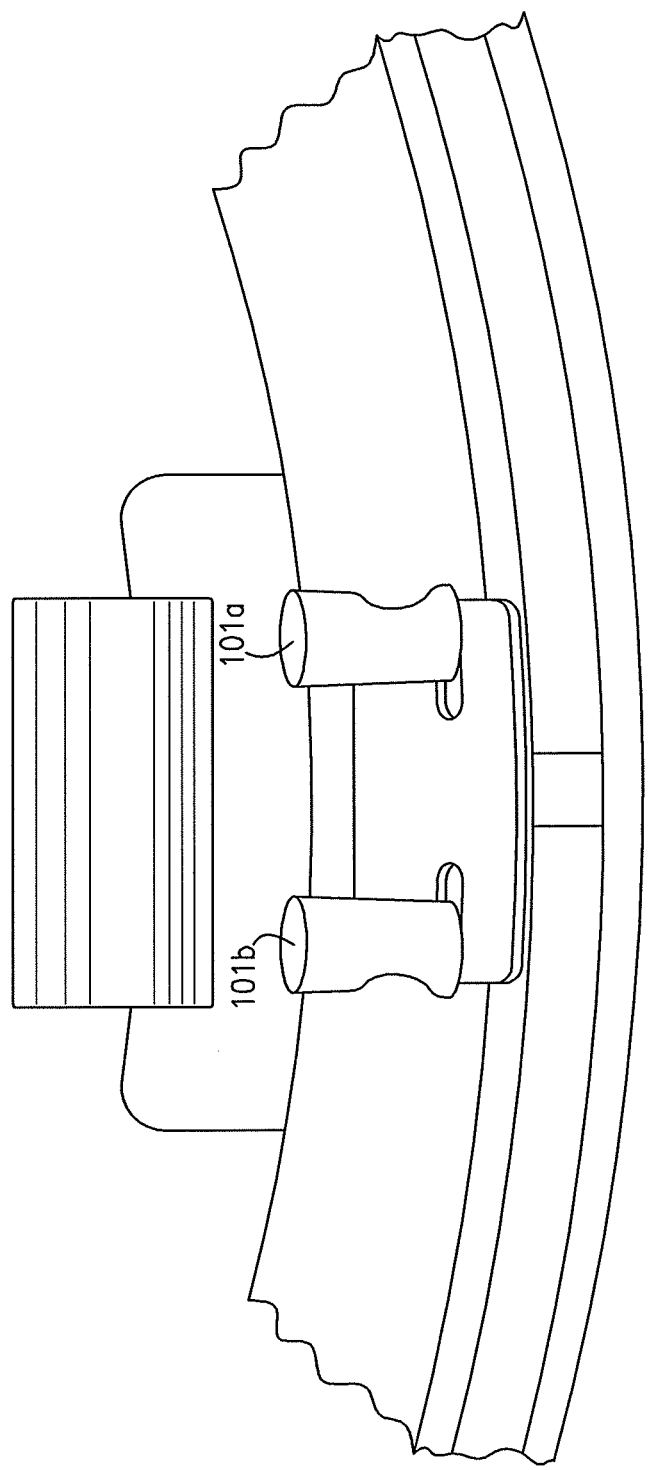

The Tank Trolley carrier handle pin locks 101a and 101b can be released and engaged with one hand, simply by laterally squeezing or releasing the handle pin locks, as shown in FIGS. 12a and 12b.

Figure 13:
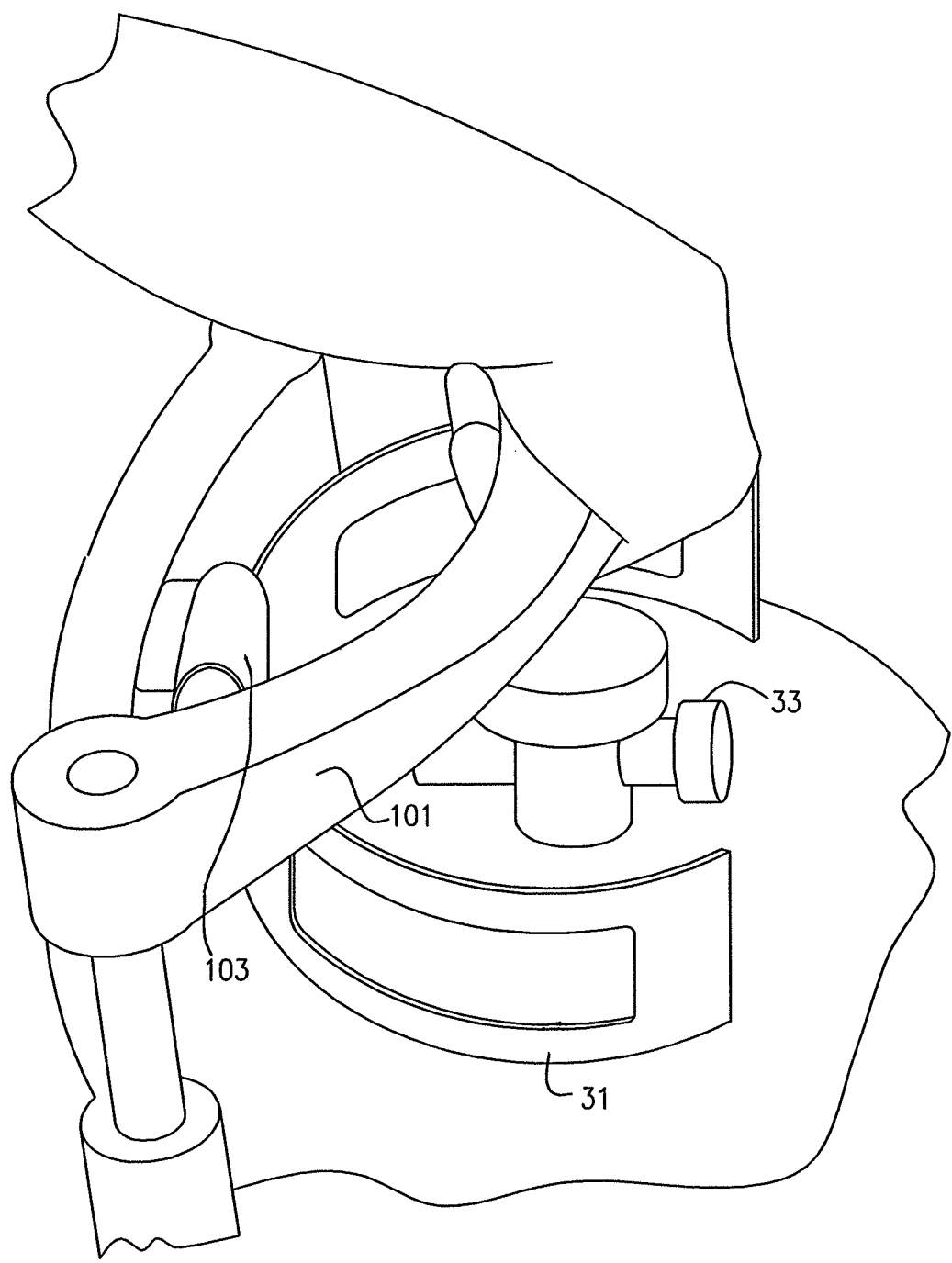
FIG. 13 shows lifting of the handle of the propane gas tank carrier.

To transport the tank using the Tank Trolley carrier, just squeeze the locks 101a and 101b and pull up on the handle 101, as shown FIG. 13.

Figure 14:
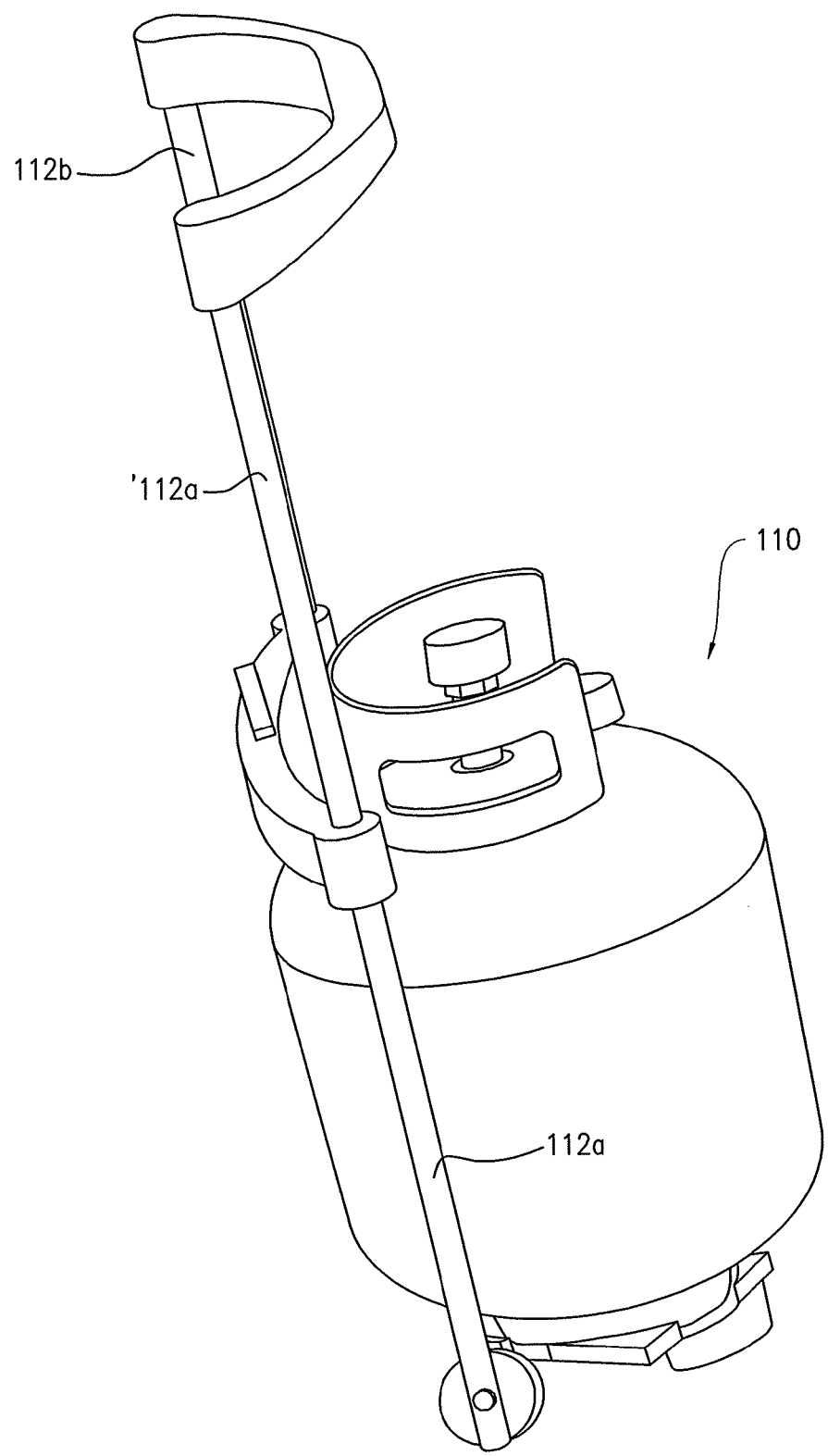
FIG. 14 depicts a transport mode of the propane gas tank.

The telescoping handle 101 is extended to a most comfortable height. The pin locks will engage into the nearest pin location. Handle 101 is then tilted back and the tank 30 can be easily wheeled away, as shown in FIG. 14.

Figure 15:
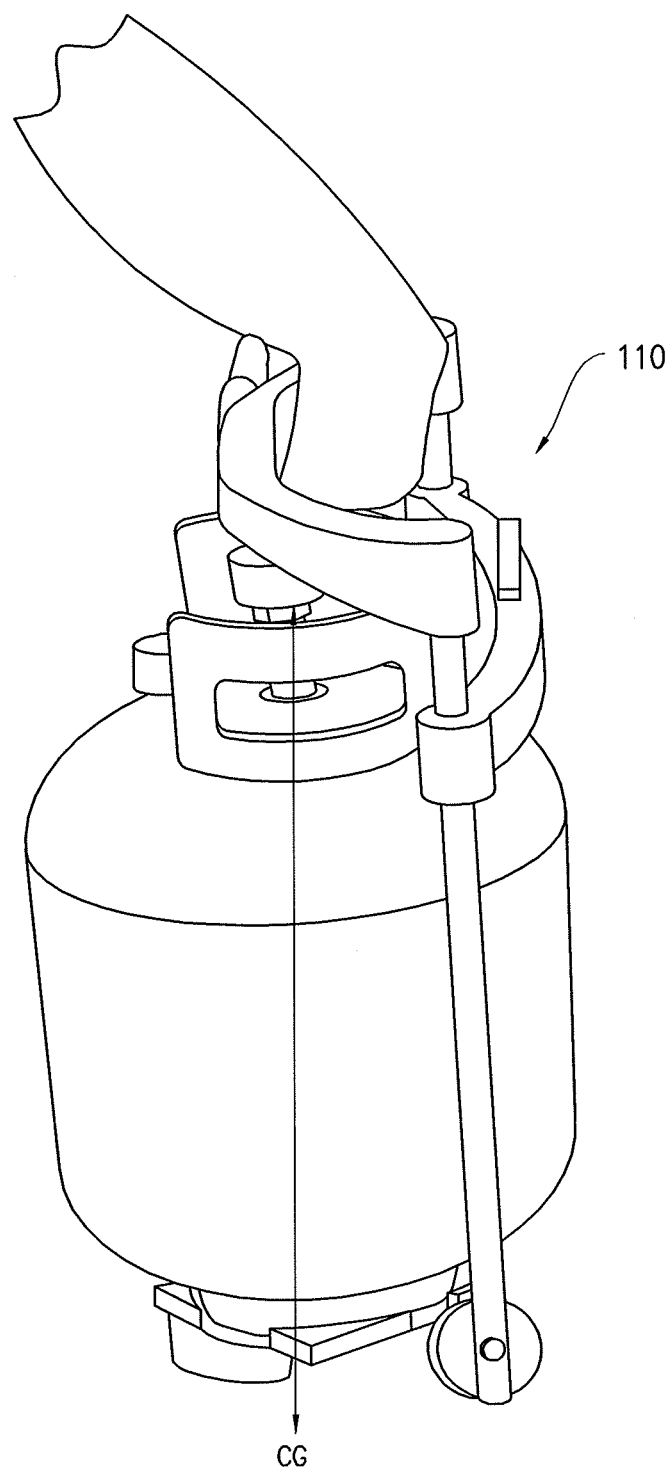
FIG. 15 depicts a lifting mode of the propane gas tank on the carrier.

To use the Tank Trolley carrier as a lifter, release the pin locks and depress the telescoping handle into the lowest position, as shown in FIG. 15. As with the Bucket Buggy carrier, the handle of the Tank Trolley carrier is specially designed to support the tank over its center of gravity for greatest stability.

Figure 16:
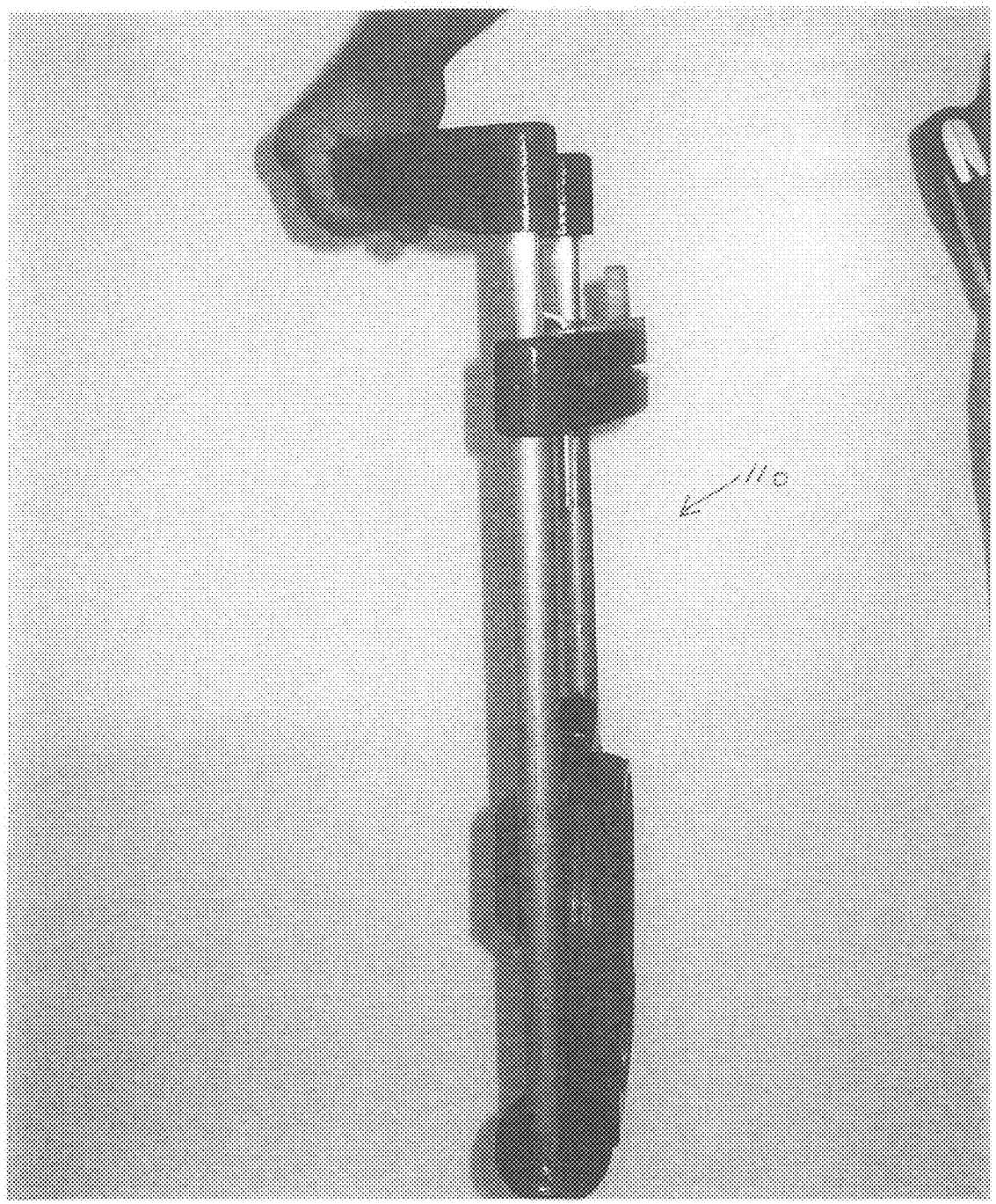
FIG. 16 depicts a storage mode of the tank carrier in a folded configuration.

The Tank Trolley folds flat for easy storage, which, as shown in FIG. 16, and to provide a convenient and economical way for retailers to display it at the point of purchase near their propane tanks.

It is understood that the above description and drawings are exemplary of the present invention and that changes in structure, application and utilization are possible without departing from the scope of the present invention as defined in the following claims.

What is claimed is:

1. A two wheeled carrier for a container, the carrier comprising:
    two wheels mounted to rotate about a common axis;
    an elongated axle member connecting the wheels and extending along the common axis;
    a handle member configured for enabling a user to both move and lift the wheeled carrier with the container, with the axle member being engaged with the handle member;
    a container support member coupled with the axle member, the container support member being configured to support a container in a position directly on the axle member with the axle member directly supporting substantially the full weight of the container on the two wheels;
    the handle member comprises two elongated strut members each having two ends with one end of each strut member being engaged with the axle member and extending away therefrom and the other end of each strut member being engaged with a handle gripping element, the handle gripping element coupled to the struts and extending in a substantially horizontal plane parallel to the support member and over the container;
    the container has a center of gravity and the handle gripping element has a hand gripping portion for being grasped by a human hand which is configured to be directly above the center of gravity of the container, supported by the container support member, with the container being carryable by the handle without tipping of the container;
    the container support member includes a portion thereof which extends away from the axle member and is configured to engage a full base of the container and wherein the extending portion of the container support member is foldable onto the strut members for storage of the wheeled carrier; and
    wherein the strut members are configured for elongation, during use of the carrier and shortening for the storage of the wheeled carrier; and
    the extending portion of the container support member is configured to rest on a floor or ground and to hold the container parallel to the ground.

2. The wheeled carrier of claim 1, wherein the axle member supports the container support member with the wheeled carrier further comprising a retaining element configured to retain the container on the axle member, the retaining element being removable from retaining the container.

3. The wheeled carrier of claim 1, wherein the container is a standard five gallon bucket with the container support member configured to fittingly engage a base of the container which is bucket-sloped.

4. The wheeled carrier of claim 1, wherein the strut members are each configured with a locking position telescoping configuration for the elongation and shortening thereof.

5. The wheeled carrier of claim 1, wherein the strut members are configured to be elongated to a length at least that of twice the height of the container whereby two stacked containers are capable of being transported by the wheeled carrier.

6. The wheeled carrier of claim 1, wherein a fixed position engagement between the strut members and the axle member is releasable such that the strut members are capable of being moved to a position of an obtuse angle relative to the container support member, whereby the wheeled carrier is convertible to a moving skid for the container.

7. The wheeled carrier of claim 1, wherein the strut members comprise at least one removable retaining element configured to engage the container to retard dislodgement or tipping of the container from the container support member.

8. The wheeled carrier of claim 7, wherein the retaining element comprises an arcuate hoop section fittingly conformed to the container, the hoop section having two ends which are hingedly attached to the strut members.

9. The wheeled carrier of claim 1, wherein the strut members are spaced from each other such that the container cannot pass therebetween.

10. The wheeled carrier of claim 1, wherein the container is a propane gas cylinder of standard size #20, #30 or #40, of 5, 7 and 10 gallons respectively, wherein the retaining element comprises a cross piece member extending between the strut members and having an adjustable height engaging clip element positioned and configured to releasably engage a collar member of the propane gas cylinder, the collar member being peripheral to a dispensing valve of the propane gas cylinder.

11. The wheeled carrier of claim 1 wherein the handle gripping element is configured to be movable to any one of: (a) a position directly above a center of gravity of a container supported by the container support member, to facilitate lifting of the container, and (b) a position away from that of position (a), to facilitate wheeled movement of the container.

* * * * *